United States Patent
Hutton et al.

(10) Patent No.: US 7,082,525 B2
(45) Date of Patent: Jul. 25, 2006

(54) BOOTING FROM NON-LINEAR MEMORY

(75) Inventors: Henry R. Hutton, Tracy, CA (US); Farshid Sabet-Sharghi, San Jose, CA (US); Robert C. Chang, Danville, CA (US); Jong Guo, Castro Valley, CA (US)

(73) Assignee: SanDisk Corporation, Sunnyvale, CA (US)

( * ) Notice: Subject to any disclaimer, the term of this patent is extended or adjusted under 35 U.S.C. 154(b) by 397 days.

(21) Appl. No.: 10/263,576

(22) Filed: Oct. 2, 2002

(65) Prior Publication Data

US 2004/0068644 A1    Apr. 8, 2004

(51) Int. Cl.
*G06F 9/24* (2006.01)
*G06F 9/445* (2006.01)
*G06F 9/00* (2006.01)

(52) U.S. Cl. .............................. 713/2; 713/1; 713/100
(58) Field of Classification Search .................. 713/2
See application file for complete search history.

(56) References Cited

U.S. PATENT DOCUMENTS

| | | | | |
|---|---|---|---|---|
| 5,295,117 A | * | 3/1994 | Okada | 365/233.5 |
| 5,459,850 A | * | 10/1995 | Clay et al. | 711/171 |
| 5,535,357 A | | 7/1996 | Moran et al. | |
| 6,058,048 A | * | 5/2000 | Kwon | 365/185.33 |
| 6,263,399 B1 | * | 7/2001 | Hwang | 711/103 |
| 6,601,167 B1 | * | 7/2003 | Gibson et al. | 713/2 |
| 6,714,479 B1 | * | 3/2004 | Takahashi et al. | 365/233.5 |
| 2003/0028760 A1 | | 2/2003 | Chang et al. | |

FOREIGN PATENT DOCUMENTS

WO   WO01/52062 A   7/2001
WO   1343082 A2   9/2003

OTHER PUBLICATIONS

ISA/EPO, "Notification of Transmittal of the International Search Report or the Declaration", mailed Sep. 22, 2004 in corresponding PCT/US03/31010, 7 pages.

Dagan, Sharon, "Designing the DiskOnChip as a Flash Disk & Boot Device Replacement", M-Systems Flash Disk Pioneers, Application Note AP-DOC-047, www.m-sys.com/files/documentation/doc/App_Note_047_Des_DOC_FD_Boot_Rev1.0.pdf, Jan. 2001, pp. 1-13.

* cited by examiner

*Primary Examiner*—Thomas C. Lee
*Assistant Examiner*—Ji H. Bae
(74) *Attorney, Agent, or Firm*—Parsons Hsue & de Runtz LLP

(57) ABSTRACT

A method and system for booting a microprocessor controlled device. A microprocessor that is designed to read from a linear storage device executes code from a non linear storage device through an interface or emulator that writes and retrieves specially formatted boot instructions to/from the non linear storage device.

14 Claims, 2 Drawing Sheets

| Signal Name | Signal Definition | Input / Output / Bi-directional |
|---|---|---|
| A2 A1 A0 | CPU address lines | Input |
| WR | CPU write strobe | Input |
| RD | CPU read strobe | Input |
| Rd only | Allows only data reads from NAND | Input |
| PCS0 | Chip select for NAND and interface chip | Input |
| enable_zone_protect | First 16 blocks are protected from erase or programming | Input |
| CLE | NAND command latch enable | Output |
| ALE | NAND address latch enable | Output |
| WE | NAND write enable signal | Output |
| RE | NAND read enable strobe | Output |
| CE | NAND chip enable | Output |
| WP | NAND write protect. When asserted all erase and program are disabled output | Output |
| boot_block_wp_error | Signal which indicates an attempt to erase or program a protected block | Output |
| NAND_RDY | Latched signal of NAND ready/nbusy signal. This is cleared when a with the I/F status register. | Output |
| CPU_DATA_Bus (7:0) | Data lines between CPU and Nand I/F device | BiDir |
| NAND_Bus (7:0) | 8 bit data bust between Nand I/F device and NAND memory | BiDir |

*FIG. 3*

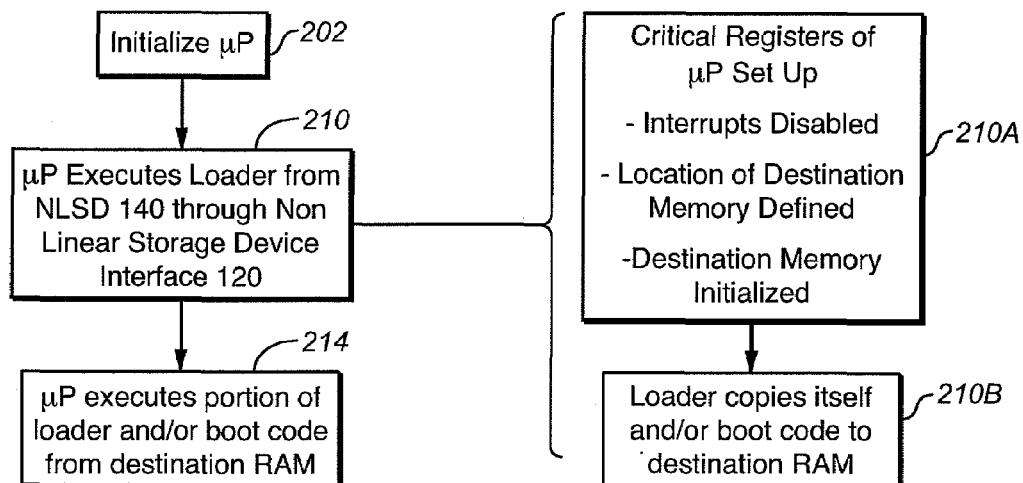

*FIG. 4*

BOOTING FROM NON-LINEAR MEMORY

CROSS REFERENCE

The attached source code on CD ROM also forms part of this description and is hereby incorporated by this reference in its entirety in accordance with 37 CFR 1.52 as an appendix containing the following files: 02085_0938\CPU_NAND_If\.cmd_decode.vhf, 1/31/02, 2KB; 02085_0938\CPU_NAND_If\int_out_bus_mux.vhf, 1/31/02, 2KB; 02085_0938\CPU_NAND_If\io_buff_control.vhf, 1/31/02, 2KB; 02085_0938\CPU_NAND_If\nand_8_bit_if.ucf, 9/18/01, 2KB; 02085_0938\CPU_NAND_If\nand_ce.vhf, 1/31/02, 2KB; 02085_0938\CPU_NAND_If\nand_control-signals-.vhf, 1/31/02, 7KB; 02085_0938\CPU_NAND_If\nand_cpu_bus.vhf, 1/31/02, 6KB; 02085_0938\CPU_NAND_If\nand_rd_control.vhf, 1/31/02, 3KB; 02085_0938\CPU_NAND_If\nand_reset_control.vhf, 1/31/02, 5KB; 02085_0938\CPU_NAND_If\nand_wp.vhf, 1/31/02, 2KB; 02085_0938\CPU_NAND_If\nand_wr_control.vhf, 1/31/02, 8KB; 02085_0938\CPU_NAND_If\nce_extend.vhf, 1/31/02, 2KB; 02085_0938\CPU_NAND_If\OCM_start_v1.asm, 2/1/02 5KB; 02085_0938\CPU_NAND_If\Page_0.img, 1/31/02, 1KB; 02085_0938\CPU_NAND_If\Page_0_readme.txt, 7/29/02, 1KB; 02085_0938\CPU_NAND_If\Page_1.img, 1/31/02, 1KB; 02085_0938\CPU_NAND_If\PowerPC_start_code.asm, 4/26/02, 9KB; 02085_0938\CPU_NAND_If\ppc_start.asm, 2/1/02, 5KB; 02085_0938\CPU_NAND_If\read_only_cntrl.vhf, 1/31/02, 6KB; 02085_0938\CPU_NAND_If\sky_stream.vhf, 1/31/02, 11KB; 02085_0938\CPU_NAND_If\status_register.vhf, 1/31/02, 2KB; 02085_0938\Hardware Design.doc, 7/29/02, 30KB.

BACKGROUND OF THE INVENTION

1. Field of the Invention

The present invention relates to the booting of microprocessor controlled devices.

2. Related Art

A variety of microprocessor controller "smart" devices now include non-volatile memory. Non volatile flash memory, in particular, is now widely used due to its ability to retain information without power and to be rapidly erased and reprogrammed. One interesting use of flash memory is to store boot code or information that a device uses on startup. The boot code is a portion of firmware code stored on the device. Usage of flash memory to store bootcode is advantageous because the firmware, including the bootcode can easily be modified and updated.

Upon booting or startup, a microprocessor reads the code in a specified location of a storage device. Typical microprocessors are generally configured to access and execute code in linear storage devices. The data in linear storage devices is accessed by reading a location specified by, speaking in general terms, a linear address consisting of the row and column of the data. Each memory cell, byte, or bit of data is accessed by specifying its is row and column. The processor will sequentially specify linear addresses from which to read.

In a typical memory system, the protocol to transfer data from the memory to the host is as follows: 1) select the memory device by asserting the chip select line; 2) select the address from which to read by asserting the address of the address bus; 3) assert the read signal. The memory device will respond with the data asserted on the data bus.

A typical program contains instruction data that are stored in various different areas of the memory that are not contiguous or adjacent. Thus, in executing a program, the processor may first execute an instruction from an address in one area and then execute an address from a second (and third etc . . . ) distant or non adjacent area. Furthermore, there is no standard dictating a logical order in which the areas are read or executed from. Each program may execute from different areas according to its own particular routines.

However, some types of storage devices such as flash memory, specifically NAND and AND type flash memory, are not linearly addressable. This means that the processor cannot read or execute code from them upon bootup. The storage space in NAND memory is broken up into discrete groups of data referred to as pages. In order to retrieve the data, the page must first be specified, then the location of the data on the page, specified as an offset from the beginning of the page, must also be specified. However, unlike in linear storage devices, if a page is, for example, 528 bytes in length, byte number 255 cannot be read without first reading the preceding 254 bytes. Furthermore, reading just one byte is a relatively more complicated procedure that does not follow the typical timing requirements of linear memory. This has, until now, made booting from non linear memory an impossible task.

SUMMARY

The system and method of booting from a non linear storage device has many applications in the startup of electronic devices that employ non linear storage devices. It can be used to boot up any microprocessor controlled device, such as but not limited to cellular phones, portable organizers, computers, global positioning systems, and smart appliances. Waiting for a device to boot-up is extremely frustrating, whether it be a cellular phone, a computer, portable organizer, or any other smart device. The time required for the boot code to start executing with the present invention is significantly faster than in prior devices that relied on shadowing of the boot code before execution. The cost of devices made in accordance with the present invention is also reduced compared to devices using a dedicated code storage device to store the boot code.

A first aspect of the invention is a method for booting a microprocessor controlled device including a non linear storage device. The method comprises receiving a system reset signal and initializing the non linear storage device such that the non linear storage device points to system boot code within the non linear storage device. It further comprises executing a first portion of the system boot code from the non linear storage device with the microprocessor.

A second aspect of the invention is a microprocessor controlled device comprising a microprocessor, volatile RAM, a non linear memory, and a linear memory emulator operable to translate code in the non linear memory into a linear format for execution by the microprocessor.

Another aspect of the invention is a microprocessor based system comprising a microprocessor operable to read linear storage devices, a non linear storage device, and means for executing code on the non linear storage device with the microprocessor operable to read linear storage devices.

BRIEF DESCRIPTION OF THE FIGURES

FIG. 3 is a table of signals utilized in system 100 and referred to in the description.

FIG. 4 is a flow chart of the general boot up sequence.

DETAILED DESCRIPTION

The following is a detailed description of illustrative embodiments of the present invention. As these embodiments of the present invention are described with reference to the aforementioned drawings, various modifications or adaptations of the methods and or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings are not to be considered in a limiting sense, as it is understood that the present invention is in no way limited to the embodiments illustrated.

The system and method of booting from a non linear storage device has many applications in the startup of electronic devices that employ non linear storage devices. While the system and method of the present invention encompasses startup of any device incorporating any type of non linear storage device, for purposes of illustrating the invention, NAND flash memory will be described.

Booting from non-linear memory has many advantages over booting from a dedicated code storage device such as ROM. It also has advantages over having to first copy or shadow a copy of code into RAM memory before the CPU can execute it. In cases where a dedicated code storage device ("DCSD") was used, the present invention reduces the cost of the electronic device utilizing the system or method of the present invention. In the case that the DCSD has already been eliminated, but the device must first copy the boot instructions into RAM in order for the microprocessor or CPU to execute the instructions and start the device, the startup time is significantly reduced with the present invention. The present invention works with virtually any processor and is more compatible with a larger variety of processors than systems that utilize a DCSD. Waiting for a device to boot-up is extremely frustrating, whether it be a cellular phone, a computer, portable organizer, or any other smart device. The time required for the boot code to start executing with the present invention is approximately the access time of the non linear storage device. In the NAND example, this is approximately 15 microseconds, whereas shadowing takes several hundred milliseconds before execution may even begin in past systems.

The source code on CD ROM also forms part of this description and is hereby incorporated by this reference in its entirety.

Figure 1A:
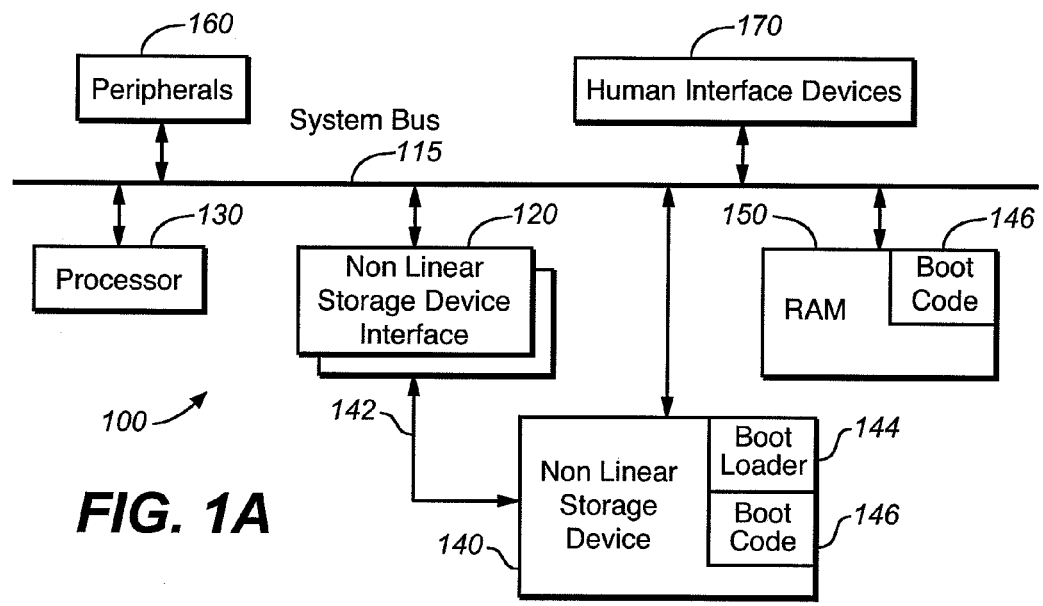
FIG. 1A is a schematic diagram of system 100.

FIG. 1A illustrates system 100. Processor 130 is connected via system bus 115 to a number of other devices. System bus 115 is connected to non linear storage device (NLSD) 140, non linear storage device interface (NLI) 120, processor 130, volatile random access memory (RAM) 150, peripherals 160, and human interface devices 170. Control lines 142 connect NLSD 140 and NLI 120. NLI 120 comprises a programmable logic device or application specific integrated circuit or logic gates incorporated into a chip sometimes described as a system in a chip. It also comprises the logic implemented in the aforementioned devices. Peripherals 160 can be printers or other output devices as well as additional drives and any other peripherals that are well known in the art. Human interface devices are things such as a keyboard, monitor, mouse, microphone or speakers and are likewise well known in the art. As the present invention will be especially advantageous with portable devices such as cellular telephones, the peripherals and human interface devices may all be integrated in one package, however they may also be traditional individual components.

Figure 1B:
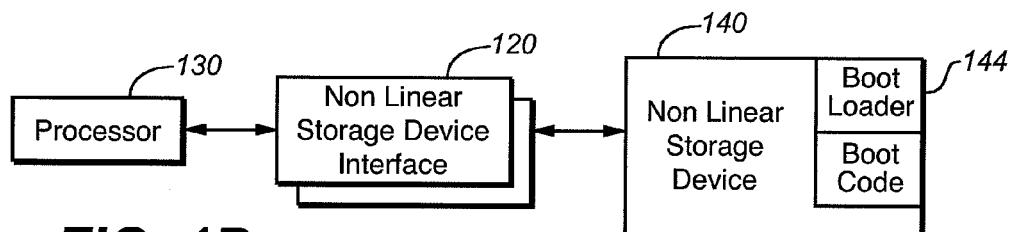
FIG. 1B is a conceptual illustration of the operation of system 100.

As previously mentioned, in the preferred embodiment, NLSD 140 comprises NAND type flash memory. Stored within NLSD 140 is boot code 146. Boot loader 144 may be considered part of boot code 146, or alternatively may be considered as separate. Each of the connections with system bus 115 are capable of two way communication and may comprise several lines although simply illustrated as a single line for clarity. Although the transfer of data to and from NLSD 140 occurs over system bus 115, a conceptual illustration of the data flow is provided in FIG. 1B in order to emphasize that boot loader 144 is executed directly from NLSD 140 through interface 120.

Figure 2:
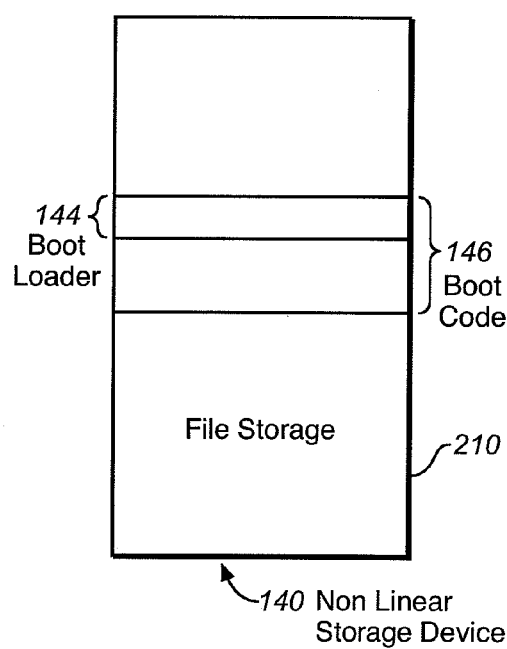
FIG. 2 is an illustration of the storage space of non linear storage device 140 of system 100.

The storage space of NLSD 140 is further illustrated in FIG. 2. NLSD 140 is a multipurpose storage device used to store all sorts of user files as well as the boot code used to start system 100 upon bootup. File storage portion 210 may have a capacity from a few kilobytes to many gigabytes. User files such as digital images, songs, programs, and other data files, may be stored in file storage portion 210. Boot code 146 and boot loader 144 are stored in dedicated areas of NLSD 140 such that they cannot inadvertently be overwritten. For more information on this, please refer to co-pending U.S. patent application Ser. No. 09/923874 filed on Aug. 6, 2001, which is hereby incorporated in its entirety by this reference. In the preferred embodiment, the boot code 146 and boot loader 144 may easily be updated from time to time if desired. Boot loader 144 preferably comprises one page of data in the NAND memory. Page length often varies slightly in different memory structures. In this example it is 512 bytes. The flash memory may be packaged in any form, such as but not limited to a prom, integrated on chip memory, Compact Flash cards, and serial non linear flash such in MutliMedia Cards (MMC) and Secure Digital (SD) cards.

Although NAND flash memory has many advantages which has led to its widespread usage, the non linear nature of the data stored in the memory has heretofore prevented execution of the data directly by microprocessors, which are designed to execute data that is linearly addressable. Previously, the data had to first be copied to RAM before it could be executed by the microprocessor. With the present invention, boot loader 144 is directly executed by the processor, i.e. it is not shadowed into RAM before execution. Reading directly from the NAND memory is quite fast, on the order of 15 microseconds. This direct execution saves precious time during the startup of system 100. This is done with non linear interface 120, which will further be described below with reference to the flow chart of FIG. 4. FIG. 3 is a table of signals or commands utilized by interface 120 that will be referred to in the description of the flow chart of FIG. 4.

FIG. 4 is a flowchart of the overall startup sequence of a device such as that exemplified as system 100 seen in FIG. 1. The microprocessor is initialized in step 202 after a system reset signal is received by either processor 130 or interface 120. This type of triggering reset can be either a hard or a soft reset. In step 202 the microprocessor executes boot loader 144 seen in FIGS. 1 and 2 directly from NLSD 140, through interface 120.

As previously mentioned, in the example of system 100 implementing NAND memory, boot loader 100 comprises instructions within the first page of the NAND memory. The instructions follow each other in a sequential manner. That is to say, that the first instruction to be executed has an address in the first area to be read and the second instruction to be executed has an address in the second area, contiguous to the first area, and so on. This is important because in NAND flash memory, and in other non linear memory, one area, byte 255 for example, cannot be read without first reading all the other area before it (the first 254 bytes).

The critical registers of the microprocessor 130 are set up in step 210A. This comprises disabling the interrupts of the microprocessor, defining the location of the destination memory, and initializing the destination memory. The destination in the example of system 100 is RAM 150. The destination memory may be one or more individual RAM chips, may be within processor 130, or may be any type of memory located elsewhere within the smart device that is being booted. The registers of the microprocessor are set as follows for an 8 bit system incorporating NAND flash memory as the non linear storage device.

| Register | Description | Address Offset |
| --- | --- | --- |
| Data Port - 16 Bit | All read and write to this port will return a 16-bit value | 0x00 |
| NAND write protect | A write to this port will disable all NAND erase and programming | 0x02 |
| NAND write protect disable | A write to this port will NAND Enable erase and programming functions. | 0x03 |
| Command Port | All NAND commands are written to this port | 0x04 |
| Address Port | All address (ADDR2:ADDR0) are written to this port | 0x05 |
| NAND Data Port | Read and write data Port for all data between the NAND device and the Host. | 0x06 |
| NAND Device Status | 0xFF indicates device is read; 0x00 indicates NAND device is Busy | 0x07 |

Transferring (reading or writing) bytes of data in the NAND memory used to illustrate the operation of NLSD 140 is a complicated process comprising multiple operations that must be precisely timed. Generally speaking, reading from NLSD 140 comprises monitoring the microprocessor address lines with NLI 120 for an address change, and then pulsing a read line to NLSD 140 when NLI 120 detects an address change. The data is then put out on data bus 115 and goes to NLI 120 where it is intern transferred again over data bus 115 to microprocessor 130. More specifically, as an example, in non-linear memory with 528 bytes/page, transfer of a specific byte generally follows the four main steps below.

1. Interface 120 calculates the location (address) of the byte within the page. This address is divided into a minimum of three bytes. For a 512 Mbit device, four bytes must be read.

2. Interface 120 selects from one of three commands (First 256, Second 256, or spare area).

3. Interface 120 writes the command in step 2 to the NLSD 140 as follows:

a. Asserts NLSD 140 chip select (CE);
b. Asserts NLSD 140 command latch enable (CLE) signal;
c. Asserts command data on NLSD 140 I/O lines;
d. Asserts NLSD 140 write line;
e. De-asserts NLSD 140 chip select; and
f. De-asserts NLSD 140 command latch enable signal.

4. Interface 120 then sends the address as follows:

a. Asserts NLSD 140 chip select (CE);
b. Asserts NLSD 140 address latch enable signal;
c. Asserts first byte of address on the NLSD 140 I/O lines;
d. Asserts NLSD 140 write enable (WE) line for the minimum specified time (typically 50 ns or more);
e. De-asserts NLSD 140 write enable (WE);
f. Asserts second byte of address on NLSD 140 I/O lines;
g. Asserts NLSD 140 write enable (WE) line for the minimum specified time typically 50 ns or more);
h. De-asserts NLSD 140 WE;
i. Asserts third byte of address on NLSD 140 I/O lines;
j. Asserts NLSD 140 write enable (WE) line for the minimum specified time (typically 50 ns or more);
k. De-asserts NLSD 140 WE;
l. Asserts forth byte of address on NLSD 140 I/O lines;
m. Asserts NLSD 140 write enable (WE) line for the minimum specified time (typically 50 ns or more);
n. De-asserts NLSD 140 WE; and
o. De-asserts ALE.

It is important to note that NLSD 140 will assert that it is busy with a delay of up to 200 ns, and that each time NLSD 140 issues a CE signal, the CE signal must remain asserted while NLSD 140 is busy. Microprocessor 120 can only read data, in a sequential manner, from NLSD 140 when NLSD 140 is ready.

Referring again to FIG. 4, within the instructions of boot loader 144 are instructions that once read and executed will copy the remainder of boot code 146 into RAM 150. When these instructions are read and executed by the microprocessor directly from NLSD 140, they will then copy the boot code 146 to RAM 150 in step 210B. In step 214, the microprocessor executes the copied portion of boot code 146 from RAM 140.

The present invention has several advantages. The interface 120 can use a very low cost programmable logic device, ASIC, or may be incorporated into the processor in a system on chip design. The system was designed to have the maximum possible access speed, therefore minimizing the startup time of any device incorporating the system or method of the present invention. It provides a simple register based access model to make the system easy to use and incorporate by programmers. It also supports different system configurations and platforms. For example, 8, 16, 32 or other bit systems can be supported.

While embodiments of the present invention have been shown and described, changes and modifications to these illustrative embodiments can be made without departing from the present invention in its broader aspects. Thus, it should be evident that there are other embodiments of this invention which, while not expressly described above, are within the scope of the present invention and therefore that the scope of the invention is not limited merely to the illustrative embodiments presented. Therefore, it will be understood that the appended claims set out the metes and bounds of the invention. However, as words are an imperfect way of describing the scope of the invention, it should also be understood that equivalent structures and methods while not within the express words of the claims are also within the true scope of the invention.

The invention claimed is:

1. A method for booting a microprocessor controlled device including a non linear storage device, the method comprising:
receiving a system reset signal;
initializing the non linear storage device such that the non linear storage device points to system boot code within the non linear storage device; and
executing a first portion of the system boot code from the non linear storage device with the microprocessor, wherein executing the first portion of the system boot code residing in the non linear storage device comprises monitoring address lines of the microprocessor for an address change, and reading the non linear memory as a result of a change detected during monitoring.

2. The method of claim 1 wherein the first portion of the system boot code is executed by the microprocessor without first copying the first portion of the system boot code into RAM.

3. The method of claim 1 wherein the portion of the system boot code residing in the non linear storage device executed by the microprocessor is 512 bytes or less.

4. The method of claim 1. wherein the non linear storage device comprises NAND flash memory.

5. The method of claim 1 further comprising:
copying a second portion of system boot code from the non linear storage device into RAM;
executing the second portion of the system boot code from the RAM with the microprocessor.

6. A method for booting a microprocessor controlled device including a non linear storage device, the method comprising:
receiving a system reset signal;
initializing the non linear storage device such that the non linear storage device points to system boot code within the non linear storage device; and
executing a first portion of the system boot code from the non linear storage device with the microprocessor, said first portion of the system boot code containing instructions contiguously located such that a first instruction to be executed has an address in a first area to be read and a subsequent instruction to be executed has an address in a subsequent area to be read, said subsequent area physically contiguous to said first area, wherein executing a first portion of the system boot code residing in the non linear storage device with the microprocessor comprises:
monitoring address lines for of the microprocessor an address change; and
pulsing a read line to the non linear memory when the address change is detected.

7. The method of claim 6 wherein executing a first portion of the system boot code residing in the non linear storage device with the microprocessor further comprises:
receiving data from the non linear memory after the pulse; and
providing the data to the microprocessor.

8. A microprocessor based system comprising:
a microprocessor operable to read linear memory devices;
non linear flash memory;
code stored in the non linear flash memory; and
an interface that enables the microprocessor to execute the code directly from the non linear flash memory, the interface operable to pulse a read line to the non linear memory when an address change is detected, and to receive data from the non linear memory after the pulse, said code comprising a group of instructions operable to initialize the system until the microprocessor executes from a linear memory.

9. The system of claim 8 wherein the non linear flash memory comprises NAND type flash memory, and wherein the code occupies the first page of the NAND type flash memory.

10. The system of claim 8 wherein the code contains instructions directing the microprocessor to:
initialize the microprocessor;
initialize one or more random access memories; and
copy boot code to the one or more random access memories.

11. The system of claim 10 wherein the code further contains instructions directing the microprocessor to execute the boot code from the one or more random access memories.

12. The system of claim 8 wherein the non linear flash memory comprises AND type flash memory.

13. A microprocessor based system comprising:
a microprocessor operable to read linear storage devices;
a non linear storage device;
means for directly executing a first group of code on the non linear storage device with the microprocessor that is operable to read linear storage devices, said means for directly executing comprising means for monitoring address lines of the microprocessor for an address change and for pulsing a read line to the non linear memory when the address change is detected, said first group of code comprising boot code.

14. The system of claim 13, further comprising means for transferring a second group of code to one or more random access memories, said second group of code to be executed by the microprocessor.

* * * * *